US010247638B2

(12) United States Patent
Lee et al.

(10) Patent No.: US 10,247,638 B2
(45) Date of Patent: Apr. 2, 2019

(54) BEARING TEST APPARATUS FOR TESTING BEHAVIOR OF THE BEARING

(71) Applicant: KOREA INSTITUTE OF SCIENCE AND TECHNOLOGY, Seoul (KR)

(72) Inventors: Yong Bok Lee, Seoul (KR); Bok Seong Choe, Seoul (KR); Wonil Kwak, Seoul (KR); Jeon Kook Lee, Seoul (KR); Ou Seok Seo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 184 days.

(21) Appl. No.: 15/399,073

(22) Filed: Jan. 5, 2017

(65) Prior Publication Data

US 2018/0136081 A1 May 17, 2018

(30) Foreign Application Priority Data

Nov. 11, 2016 (KR) .................. 10-2016-0150156
Nov. 11, 2016 (KR) .................. 10-2016-0150157

(51) Int. Cl.
*G01M 13/04* (2019.01)
*G01D 5/28* (2006.01)
*F16C 19/04* (2006.01)

(52) U.S. Cl.
CPC .............. *G01M 13/04* (2013.01); *G01D 5/28* (2013.01); *F16C 19/04* (2013.01); *F16C 2300/52* (2013.01)

(58) Field of Classification Search
CPC ....... G01L 3/02; G01L 5/0009; G01L 5/0028; G01L 5/0042; G01L 5/24; G01M 13/04; F16C 19/04; F16C 2300/52

(Continued)

(56) References Cited

U.S. PATENT DOCUMENTS 2,580,395 A * 1/1952 Bellizzi .................. G01L 3/1457
  73/862.191
4,738,336 A * 4/1988 Smith ..................... F16N 29/02
  184/108

(Continued)

FOREIGN PATENT DOCUMENTS

JP           4147825 B2    7/2008
JP      2014-126178 A      7/2014

(Continued)

OTHER PUBLICATIONS

Sol Ji Ryu et al., "Tribological Study for Cage of Turbopump Ball Bearing by Sound Vibration and Friction Torque under Cyrogenic Temperature," Conference papers of the Korean Society for Aeronautical and Space Sciences, 2014, vol. 11, pp. 290-292.

(Continued)

*Primary Examiner* — Benjamin R Schmitt
(74) *Attorney, Agent, or Firm* — NSIP Law

(57) ABSTRACT

A bearing test apparatus for testing a test bearing, including a chamber, a bearing cap disposed in the chamber and coupled to an outer wheel of the test bearing, a driving shaft connected to an inner wheel of the test bearing to rotate the inner wheel, an extension arm extending in a radial direction of the bearing cap from the bearing cap to expose one end thereof out of the chamber, and a measurement arm configured to make a contact with one end of the extension arm and configured to be rotatable by the extension arm. When a rotation force is applied to the bearing cap by the outer wheel, the extension arm is used to measure a force applied to the measurement arm, which is used to obtain an exclusive torque of the test bearing.

24 Claims, 7 Drawing Sheets

(58) Field of Classification Search
USPC ..... 73/9, 118.01, 788, 856, 862.08, 862.191, 73/862.195, 865.6
See application file for complete search history.

(56) References Cited

U.S. PATENT DOCUMENTS

| | | | | |
|---|---|---|---|---|
| 5,959,189 | A | * 9/1999 | Jeng | G01M 13/04 73/10 |
| 6,070,325 | A | * 6/2000 | Miyata | F16C 19/186 29/407.05 |
| 2014/0185975 | A1 | 7/2014 | Furukoshi | |
| 2014/0346741 | A1 | 11/2014 | Takagi | |
| 2016/0025592 | A1 | 1/2016 | Lee et al. | |

FOREIGN PATENT DOCUMENTS

| | | |
|---|---|---|
| JP | 2014-227987 A | 12/2014 |
| JP | 2016-121956 A | 7/2016 |
| KR | 10-2006-0016216 A | 2/2006 |
| KR | 10-0724799 B1 | 6/2007 |
| KR | 10-0949242 B1 | 3/2010 |
| KR | 10-1447573 B1 | 10/2014 |
| KR | 10-1572907 B1 | 12/2015 |
| KR | 10-1579282 B1 | 12/2015 |

OTHER PUBLICATIONS

Jeon, Seong-Min, et al. "Evaluation of Friction Torque for a Turbopump Ball Bearing." Journal of the Korean Society of Tribologists and Lubrication Engineers 27.1 (2011): 25-33. (9 pages in Korean with English Abstract).

* cited by examiner

BEARING TEST APPARATUS FOR TESTING BEHAVIOR OF THE BEARING

CROSS-REFERENCE TO RELATED APPLICATION

This application claims priority to Korean Patent Applications Nos. 10-2016-0150156 and 10-2016-0150157, filed on Nov. 11, 2016, and all the benefits accruing therefrom under 35 U.S.C. § 119, the contents of which in its entirety are herein incorporated by reference.

BACKGROUND

1. Field

The present disclosure relates to a bearing test apparatus, and more particularly, to a test apparatus for testing a behavior of a bearing.

[Description about National Research and Development Support]

This study was supported by the Junior Researcher Support Project of Ministry of Science, ICT and Future Planning, Republic of Korea (Project No. 1711030389) under the superintendence of National Research Foundation of Korea.

2. Description of the Related Art

A bearing is a mechanical element which fixes a shaft of a rotating machine at a certain location and protects a rotation of the shaft while supporting a weight of the shaft and a load applied to the shaft.

Such an industrial bearing is an important part in machines which constitute every kind of equipment and installation associated with manufacture and production lines in overall industries.

In order to ensure excellent dynamic stability and reduce shaking and vibrations, the bearing should have durability and stability first, and for this, the durability and stability of a designed or manufactured bearing should be evaluated. In order to evaluate the durability and stability of a bearing, a behavior exhibited while the bearing is in operation should be evaluated.

One of behaviors which should be evaluated in relation to the service life of a bearing is a torque of the bearing which the bearing should endure in operation. In an existing technique, there has been not yet proposed an effective method for directly measuring an exclusive torque of the bearing.

When evaluating a bearing, an environment suitable for the bearing is constructed, and then various factors are evaluated. Thus, for example, the measured exclusive torque may have an error due to a path for supplying a cooling fluid.

Moreover, it is possible to evaluate whether a bearing is stably operating, by measuring a whirling motion of a case which supports a bearing driving unit such as a ball.

Meanwhile, a general industrial bearing is generally operating in a state of being lubricated with grease or oil, and durability is also evaluated under conditions similar to an actual service environment.

However, a so-called "cyrogenic bearing" operating in a cyrogenic environment is used as an important part at an LNG pump or a cyrogenic turbo pump. The cyrogenic bearing gets the limelight at a space industry or the like. Generally, a temperature below −183° C. is called as a "cyrogenic" temperature. This generally corresponds to 90 K which is a boiling point of liquid oxygen.

It is not suitable to apply an existing device or method for evaluating durability of a bearing directly to the cyrogenic bearing, and an evaluation technique and method for the cyrogenic bearing is not yet systematized.

The cyrogenic bearing should be experimented under extreme conditions, namely under a cyrogenic environment, which can be accessed just very limitedly, experiment data cannot be easily acquired using an electric device.

SUMMARY

The present disclosure is directed to providing a test apparatus which may allow efficient measurement of an exclusive torque of a bearing and a whirling motion of a cage, which are main factors for testing durability soundness of the bearing. Further, the present disclosure is particularly directed to providing a test apparatus which may allow efficient measurement of a behavior of a cyrogenic bearing that operates in a cyrogenic environment.

In one aspect of the present disclosure, there is provided a bearing test apparatus for testing a bearing (hereinafter, referred to as a "test bearing"), which is a target for test, by providing a test environment suitable for the test bearing, the bearing test apparatus comprising: a chamber; a bearing cap disposed in the chamber and coupled to an outer wheel of the test bearing; a driving shaft connected to an inner wheel of the test bearing to rotate the inner wheel; an extension arm extending in a radial direction of the bearing cap from the bearing cap to expose one end thereof out of the chamber; and a measurement arm configured to make a contact with one end of the extension arm and configured to be rotatable by the extension arm, wherein an exclusive torque of the test bearing is obtained by measuring a force applied to the measurement arm by the extension arm when a rotation force is applied to the bearing cap by the outer wheel.

According to an embodiment, the bearing test apparatus may further comprise a load cell configured to make a contact with the measurement arm at an opposite side in a rotation direction of the measurement arm to measure a force applied to the measurement arm.

According to an embodiment, the bearing test apparatus may further comprise a pre-load member configured to apply a predetermined force to the measurement arm at a location opposite to the load cell.

According to an embodiment, the measurement arm may be rotatable based on a rotation axis which is parallel to a rotation axis of the driving shaft.

According to an embodiment, the bearing test apparatus may further comprise a radial rod configured to rotatably support the measurement arm, wherein the radial rod pushes the extension arm to apply a radial load to the bearing cap.

According to an embodiment, any one of one end of the extension arm and one end of the measurement arm which make a contact with each other may be formed to have a spherical face, so that one end of the extension arm and one end of the measurement arm make a point contact.

According to an embodiment, the test bearing may be a ball bearing, which includes a plurality of balls disposed between the outer wheel and the inner wheel and a cage for fixing locations of the plurality of balls, the cage may include a reflecting surface protruding in an axial direction of the driving shaft, an optical displacement sensor for irradiating light toward the reflecting surface may be inserted into the bearing cap, and a whirling motion of the cage may be measured by means of a distance from the cage to the reflecting surface, measured by the optical displacement sensor.

According to an embodiment, two optical displacement sensors disposed with an angle of 90 degrees may be inserted into the bearing cap.

According to an embodiment, the bearing cap may form a first inner space, the bearing test apparatus may include a cooling fluid tube formed through the bearing cap to introduce a cooling fluid into the first inner space, and the cooling fluid tube may extend to pass through a center of an upper end of the bearing cap, thereby guiding the cooling fluid to a center of an upper end of the test bearing.

According to an embodiment, the bearing test apparatus may further comprise a flexible gasket formed to surround the cooling fluid tube and fixed to the bearing cap, wherein the gasket may be bent due to a difference between a pressure in the first inner space and a pressure out of the first inner space, formed when the cooling fluid flows into the first inner space, to seal a gap between the bearing cap and the cooling fluid tube.

According to an embodiment, the cooling fluid tube may include: an inner extension surrounded by the gasket; and an outer extension formed shorter than the inner extension and extending toward an upper surface of the gasket, wherein when being bent, the gasket may make a contact with an end of the outer extension.

According to an embodiment, the outer extension may have a sharp end, and when being bent, the gasket may make a linear contact with the end of the outer extension.

According to an embodiment, the outer extension and the inner extension may be spaced apart from each other to have a gap formed therebetween.

According to an embodiment, the cooling fluid tube may serve as an axial rod which presses an upper end of the bearing cap to apply an axial load thereto.

According to an embodiment, the cooling fluid tube may include a large diameter portion pressing the upper end of the bearing cap and a small diameter portion extending from the large diameter portion to pass through the bearing cap, the large diameter portion may be connected to the bearing cap by means of a connection bearing, and the small diameter portion and the bearing cap may be spaced apart from each other so that the cooling fluid tube does not disturb rotation of the bearing cap.

According to an embodiment, a second inner space for accommodating the bearing cap may be formed at the chamber, and the cooling fluid may flow from the first inner space to the second inner space via the test bearing.

DETAILED DESCRIPTION

Figure 1:
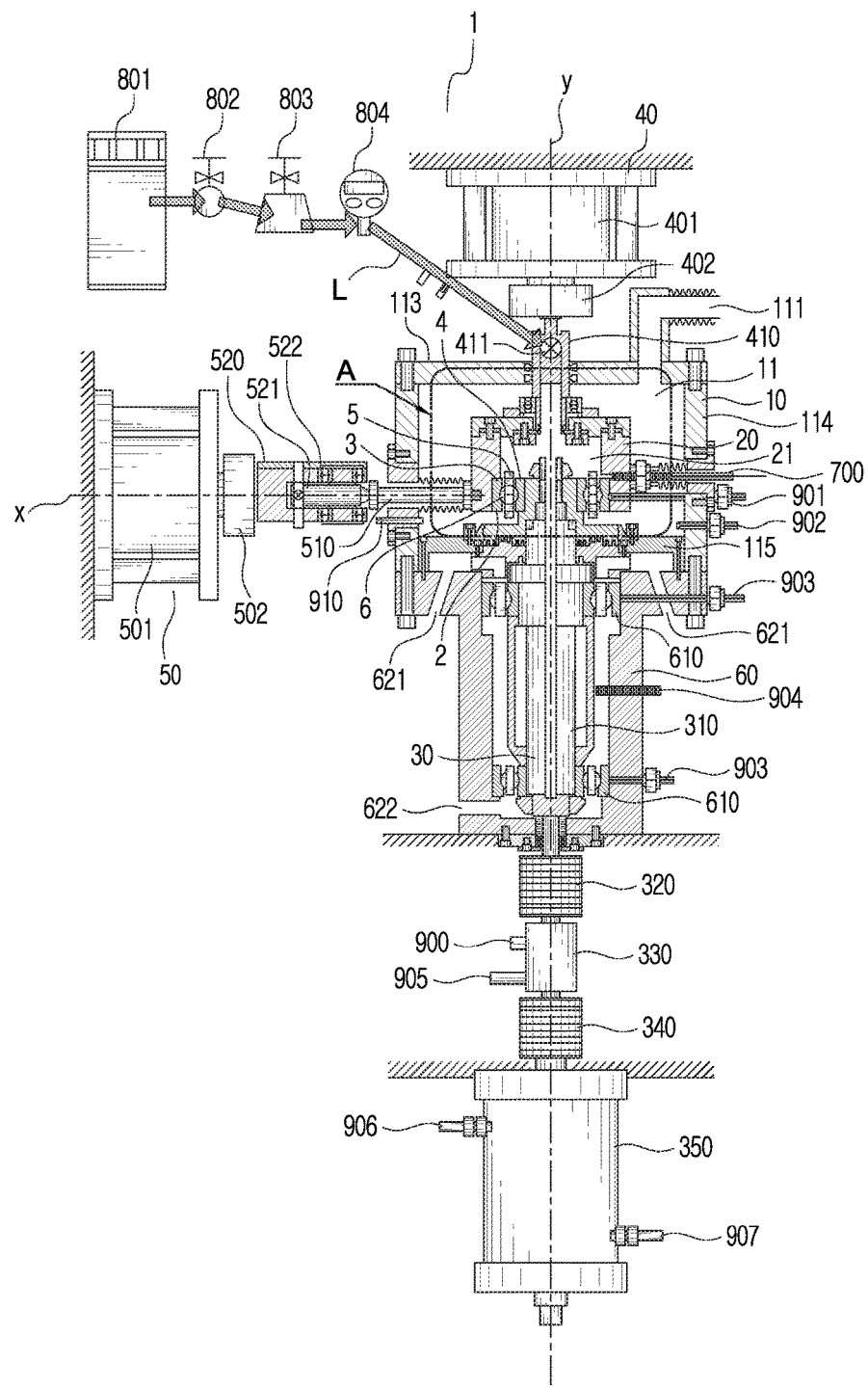
FIG. 1 is a diagram showing a bearing test apparatus according to an embodiment of the present disclosure.

Hereinafter, an embodiment of the present disclosure will be described with reference to the drawings. Even though the present disclosure is described based on the embodiment depicted in the drawings, this is just an example, and the essential configuration and operations of the present disclosure are not limited thereto.

FIG. 1 is a diagram showing a bearing test apparatus 1 according to an embodiment of the present disclosure.

The test apparatus 1 gives a test environment of a bearing (hereinafter, referred to as a "test bearing") 2, which is a target for test, and tests a behavior of the test bearing 2.

The test bearing 2 of this embodiment is a ball bearing including an outer wheel 3, an inner wheel 4, a plurality of balls 6 disposed between the outer wheel 3 and the inner wheel 4, and a cage 5 for fixing locations of the plurality of balls 6.

The test apparatus 1 includes a chamber 10 defining a second inner space 11 and a bearing cap 20 accommodated in the second inner space 11 defined by the chamber 10.

The bearing cap 20 defines a first inner space 21. The bearing cap 20 accommodates the test bearing 2 in the first inner space 21 to surround the test bearing 2.

The outer wheel 3 of the test bearing 2 is detachably coupled to the bearing cap 20 and allows a load applied to the bearing cap 20 to be entirely transferred to the test bearing 2.

The test apparatus 1 includes a driving shaft 30 having a rotation axis formed in a y-axis direction.

The driving shaft 30 includes a main shaft 310, and a part of the main shaft 310 extends into the bearing cap 20 through a lower end of the chamber 10 and is connected to the inner wheel 4 of the test bearing 2.

In more detail, as shown in FIG. 1, a spacer 621 is coupled to a part of the main shaft 310 extending in the chamber 10 and the bearing cap 20 by means of a lock nut 312. A lower surface of the spacer 621 is spaced apart from a lower frame 115 of the chamber 10 so that the spacer 621 rotates together when the main shaft 310 (namely, the driving shaft 30) rotates. The inner wheel 4 of the test bearing 2 is fit into the spacer 621, and the inner wheel 4 of the test bearing 2 rotates by means of the rotation of the driving shaft 30.

By exchanging the spacer 621, it is possible to test durability by applying test bearings 2 of various sizes to the same system.

The test apparatus 1 of this embodiment tests various behaviors of the test bearing 2 by means of various devices connected to the bearing cap 20 while rotating the inner wheel 4 of the test bearing 2.

The test bearing 2 of this embodiment is a cyrogenic bearing which operates in a cyrogenic environment.

According to this embodiment, in order to realize a service environment of the cyrogenic bearing, the test bearing 2 is exposed to an extremely low-temperature cooling fluid ("cyrogenic fluid") when being operated. In this embodiment, the cyrogenic fluid is, for example, liquid nitrogen ($LN_2$).

The cyrogenic fluid L flows from an external tank 801 through a fluid inlet tube 411 into the first inner space 21 of the bearing cap 20 and lubricates and cools the test bearing 2 while passing by the test bearing 2. The cyrogenic fluid L passes between the inner wheel 4 and the outer wheel 3 of the test bearing 2, and then the cyrogenic fluid L flows to the second inner space 11 of the chamber 10, stays therein and then discharges out though a fluid outlet tube 111 (see FIG. 4).

One of main factors associated with service life of the test bearing 2 is a bearing torque which should be endured by the test bearing 2 in operation.

An exclusive torque of the test bearing 2 means a torque received by the outer wheel 3 due to a force transmitted by a rotation force of the inner wheel 4 rotating together with the driving shaft 30. If the rotation of the bearing cap 20 coupled to the outer wheel 3 is not substantially restricted, the torque received by the outer wheel 3 (namely, the exclusive torque of the test bearing 2) means a torque of the bearing cap 20.

According to this embodiment, since a cyrogenic environment is formed in the chamber 10 by means of the cyrogenic fluid, if a torque is measured using an electronic instrument, costs and efficiency may deteriorate. Therefore, the test apparatus 1 of this embodiment is configured to be able to measure the exclusive torque of the test bearing 2 while minimizing an influence caused by the cyrogenic environment.

Figure 2:
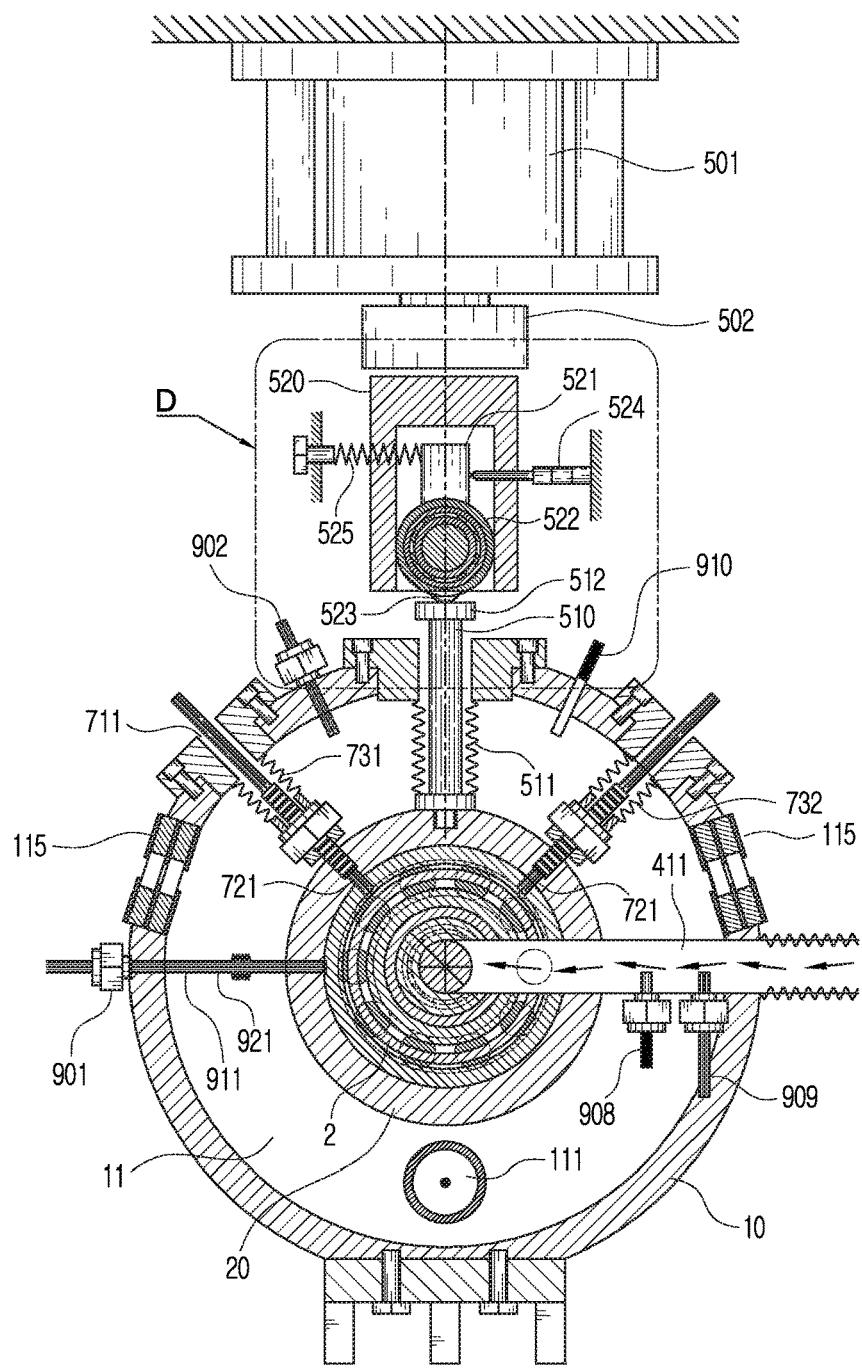
FIG. 2 is a sectional view showing the bearing test apparatus of FIG. 1, observed from the above.
Figure 3:
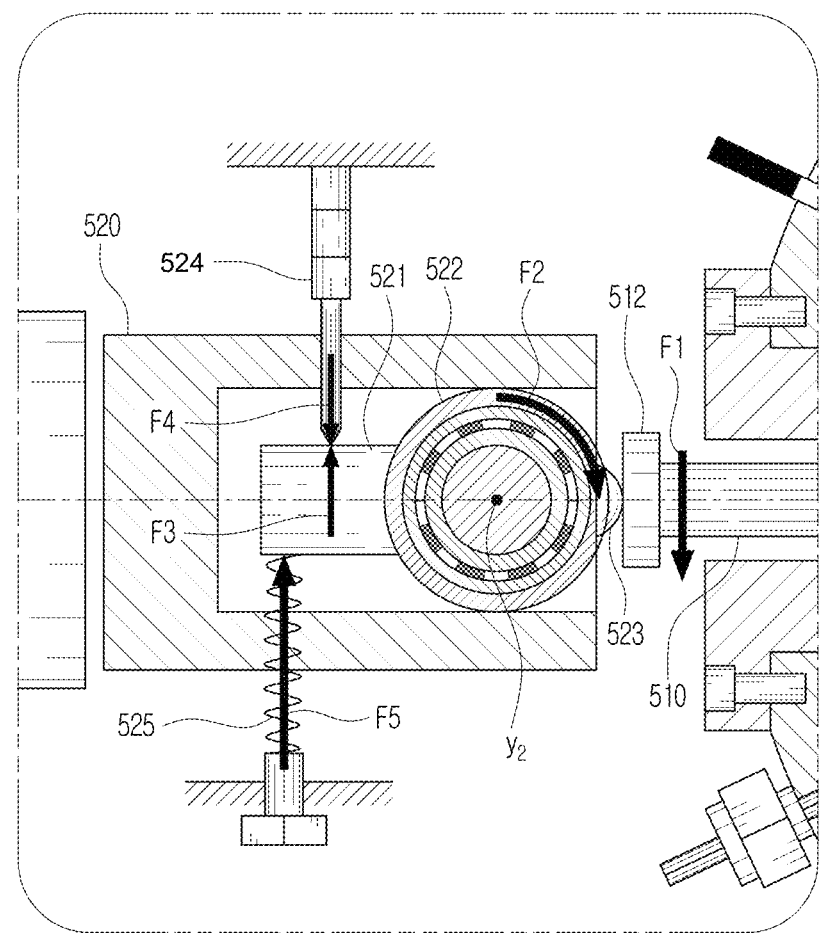
FIG. 3 is an enlarged view showing a portion D of FIG. 2.

FIG. 2 is a sectional view showing the bearing test apparatus 1 of FIG. 1, observed from the above, and FIG. 3 is an enlarged view showing a portion D of FIG. 2.

According to this embodiment, in order to measure the exclusive torque of the test bearing 2, an extension arm 510 is coupled to the bearing cap 20 by means of screwing. The extension arm 510 extends in a radial direction of the bearing cap 20 (in an x-axis direction) from an outer surface of the bearing cap 20, and one end 512 of the extension arm 510 passes through the chamber 10 and is exposed out of the chamber 10.

The extension arm 510 provided through the chamber 10 is isolated from the cyrogenic environment of the chamber 10 by means of a tube 511. The tube 511 has a wrinkled shape similar to an accordion to prevent the degree of rotation freedom of the bearing cap 20 from being restricted by the chamber 10.

At an outer portion of the chamber 10, a radial rod 520 extending in an x-axis direction is formed.

The radial rod 520 has a space opened toward the extension arm 510, and a measurement arm 521 is disposed in the corresponding space. The measurement arm 521 is rotatably supported by a bearing 522 to be rotatable with respect to the radial rod 520 based on an $y_2$ axis which is parallel to the y axis.

One end 523 of the measurement arm 521 makes a contact with one end 512 of the extension arm 510. A load cell 524 makes a contact with the measurement arm 521, which extends in a direction opposite to one end 523 based on the $y_2$ axis, at an opposite side in a rotation direction (in a clockwise direction in FIG. 3) of the measurement arm 521.

As well shown in FIG. 3, if a torque is applied to the outer wheel 3 of the test bearing 2 so that a rotation force F1 is applied to the bearing cap 20, the measurement arm 521 receives a clockwise rotation force F2 due to the rotation force F1 applied by the extension arm 510.

According to this embodiment, one end 512 of the extension arm 510 has a flat shape, but one end 523 of the measurement arm 521 has a spherical surface (it would be understood that these shapes can be reversed). Therefore, one end 512 of the extension arm 510 and one end 523 of the measurement arm 521 make a point contact with each other.

Accordingly, the rotation of the extension arm 510 is not disturbed by the contact of the measurement arm 521 and the extension arm 510, and a force loss caused by a surface contact is prevented, thereby ensuring, an accurate measurement of torque.

Due to the rotation force F2 in a clockwise direction, the measurement arm 521 pushes the load cell 524 by a predetermined force F3.

Referring to FIG. 3, in this embodiment, the bearing test apparatus includes a pre-load member 525 for applying a predetermined force F5 to the measurement arm 521 at a location opposite to the load cell 524. The pre-load member 525 is a kind of spring which pushes the measurement arm 521 so that the load cell 524 and the measurement arm 521 keep their contact state. Moreover, the pre-load member 525 is formed to apply a predetermined pre-load F5, and the pre-load F5 becomes a basis for calculating an intensity of the force F3 applied to the measurement arm 521 by the extension arm 510 from the force measured at the load cell 524. According to an embodiment, the load cell 524 measures the force F3 applied to the measurement arm 521 by subtracting the pre-load F5 from the measured force F4.

Prior to operating the test apparatus 1, a predetermined torque may be applied to the bearing cap 20 by using a tool such as a wrench, then the force applied to the measurement arm 521 may be measured at the load cell 524, and then an interaction formula between the applied torque and the measured force may be derived.

When the test apparatus 1 is operated, the force measured by the load cell 524 may be put into the prepared interaction formula with the torque to measure the exclusive torque of the test bearing 2.

Meanwhile, depending on an environment where the test bearing 2 is used, for example a space launch vehicle, a great load may be applied to the test bearing 2.

As shown in FIG. 2, in this embodiment, the radial rod 520 is connected to the air cylinder 501 to be movable in an x-axis direction. A radial load cell 502 capable of measuring a radial load applied to the radial rod 520 is provided between the air cylinder 501 and the radial rod 520.

The radial rod 520 may reproduce the radial load applied to the test bearing 2 by pushing the extension arm 510 by means of the measurement arm 521 to apply a radial load to the bearing cap 20.

As described above, since one end of the extension arm 510 makes a point contact with one end of the measurement arm 521 which is rotatable, even though the radial rod 520 pushes the extension arm 510 with a strong force, the degree of freedom of the extension arm 510 in a rotation direction is substantially not restricted.

In an existing technique, an exclusive torque of a bearing is calculated by multiplying a measured force by a distance from an axis center of a driving shaft to a load cell. However, it is not easy to calculate an accurate torque due to various factors such as shrinkage of members exposed to the cyrogenic environment, and the measurement rod used for calculating a torque becomes a factor of restricting the degree of rotation freedom of the bearing cap.

In this embodiment, since the exclusive torque of the bearing is calculated by means of the measurement arm 521 separated from the extension arm 510, various factors causing an error as described above may be solved.

Meanwhile, if the cyrogenic fluid L flows in at a side of the bearing cap 20, an error may occur at the measured torque of the test bearing 2 due to the pressure generated while the cyrogenic fluid L flows in.

Therefore, in this embodiment, a cooling fluid tube 410 for allowing the cyrogenic fluid L flowing in through the fluid inlet tube 411 to flow into the first inner space 21 of the bearing cap 20 is provided to extend through a center of the upper end of the bearing cap 20, thereby guiding the cyrogenic fluid L to a center of the upper end of the test bearing 2.

Figure 4:
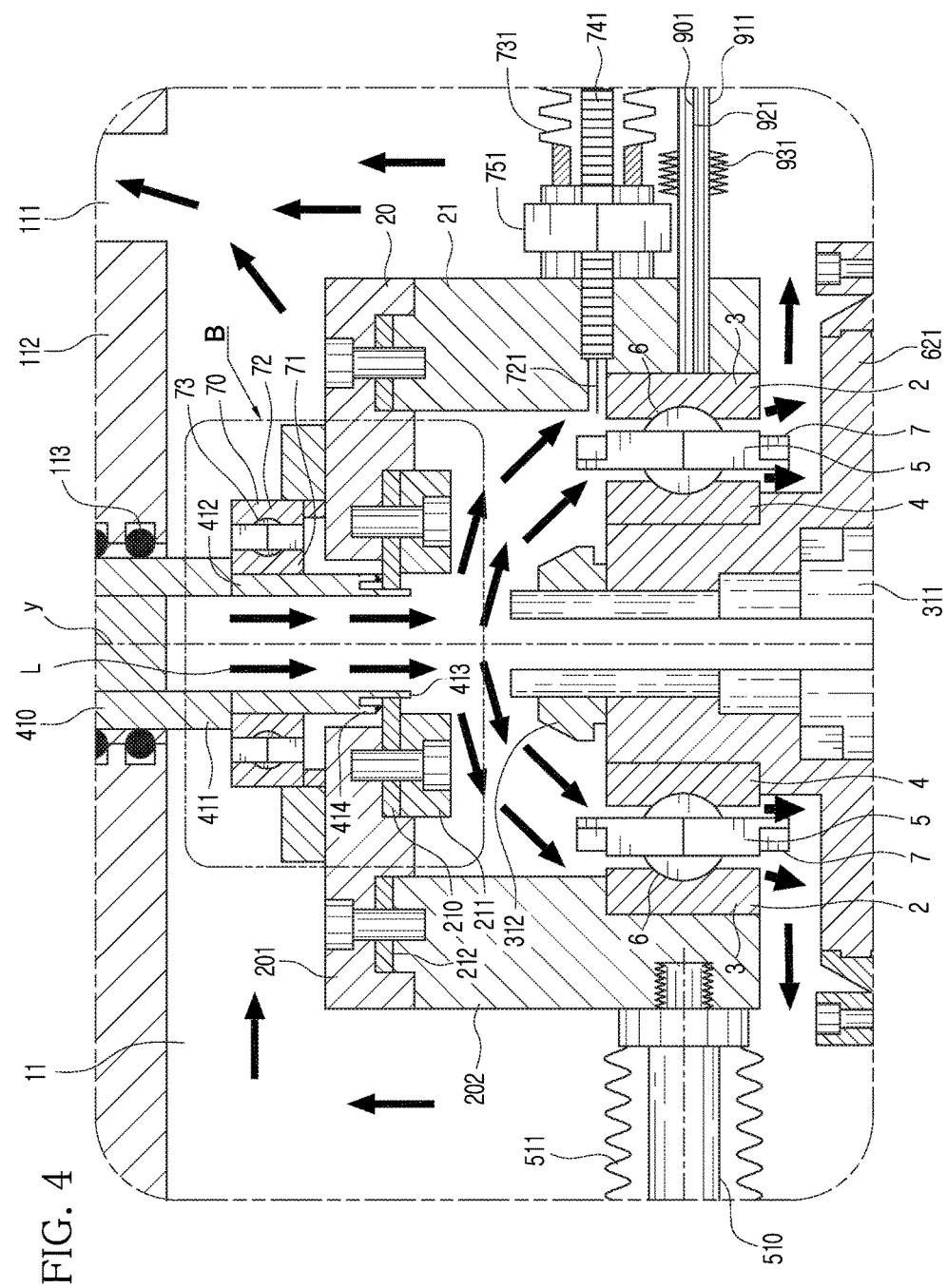
FIG. 4 is an enlarged view showing a portion A of FIG. 1.

FIG. 4 is an enlarged view showing a portion A of FIG. 1.

As shown in FIG. 4, the bearing cap 20 includes an upper end frame 201 and a side frame 202 extending from the upper end frame 201 to surround the test bearing.

A gasket 212 made of Teflon is installed between the upper end frame 201 and the side frame 202 to seal a gap between both frames.

A central axis of the cooling fluid tube 410 in a length direction is identical to the y axis, and the cooling fluid tube 410 is provided to pass through a center of the upper end frame 112 of the chamber 10. As explained later, since the cooling fluid tube 410 is linearly movable along the y axis, a predetermined gap is formed between the upper end frame 112 of the chamber 10 and the cooling fluid tube 410, and the gap is sealed by means of an O-ring 113.

The cooling fluid tube 410 includes a large diameter portion 411 and a small diameter portion 412 extending from an end of the large diameter portion 411. Even though it is depicted in the figures that a part of the large diameter portion 411 of the cooling fluid tube 410 and the small diameter portion 412 are cut, it is just for explaining their structures and the flow of the cyrogenic fluid L, and the cooling fluid tube 410 has a cylindrical hollow tube shape as a whole.

The cyrogenic fluid L supplied from the tank 801 through the control valve 802 and the pressure controller 803 to the fluid inlet tube 411 by regular amount and pressure is guided to the center of the upper end of the test bearing 2 through the cooling fluid tube 410 to flow into the first inner space 21.

The cyrogenic fluid L introduced into the first inner space 21 spreads based on the driving shaft 30 with regular pressure and distribution and flows to the test bearing 2. The cyrogenic fluid L passes between the inner wheel 4 and the outer wheel 3 of the test bearing 2, and then, the cyrogenic fluid L flows to the second inner space 11 of the chamber 10, stays therein, and then discharges out through the fluid outlet tube 111.

As shown in FIG. 4, the main shaft 311 of this embodiment has a hollow shape so that the cyrogenic fluid L is filled in the main shaft 311. Thus, the main shaft 311 may be cooled by means of the cyrogenic fluid L, and a test environment may be reproduced as if the main shaft 311 operates in a cyrogenic environment.

In this embodiment, since the cyrogenic fluid L may be allowed to flow into the first inner space 21, a measurement error of the exclusive torque of the test bearing 2 may be reduced. Moreover, a cyrogenic test environment for the test bearing 2 may be uniformly formed.

In this embodiment, since the degree of rotation freedom of the bearing cap 20 should be ensured, the small diameter portion 412 inserted into the upper end frame 201 of the bearing cap 20 is formed to have a gap with the upper end frame 201 of the bearing cap 20 and is coupled to the upper end frame 201 of the bearing cap 20 by means of a connection bearing 70.

The connection bearing 70 is a ball bearing including an inner wheel 71 fit into the small diameter portion 412, an outer wheel 72 fixed to the upper end frame 201 of the bearing cap 20, and a ball 73 disposed between the inner wheel 71 and the outer wheel 72.

The connection bearing 70 plays a role of rotatably fixing the bearing cap 20 and the cooling fluid tube 410 but does not seal the bearing cap 20 and the cooling fluid tube 410 to each other.

Therefore, the test apparatus 1 of this embodiment includes a ring-shaped gasket 210 surrounding the small diameter portion 412 of the cooling fluid tube 410. The gasket 210 is fixed to the bearing cap 20 by means of a fixing frame 211.

The gasket 210 of this embodiment is made of a flexible Teflon material. The gasket 210 is bent due to a difference between a pressure in the first inner space 21 and a pressure out of the first inner space 21 (namely, pressures of the first inner space 21 and the second inner space 11), formed when the cooling fluid flows into the first inner space 21, to seal the gap between the bearing cap 20 and the cooling fluid tube 410.

Figure 5:
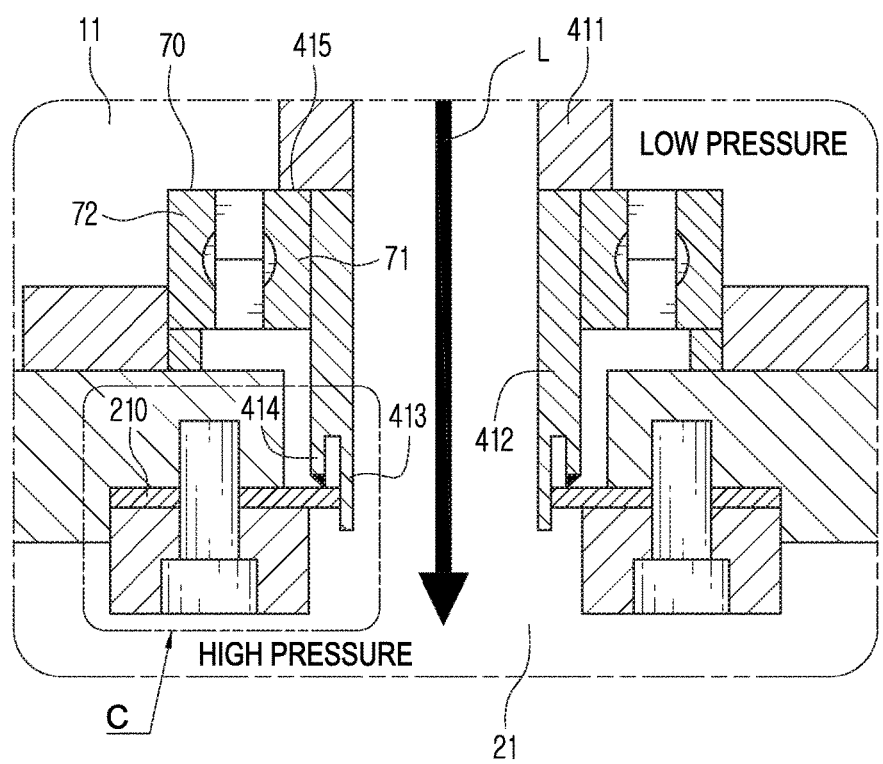
FIG. 5 is an enlarged view showing a portion B of FIG. 4.

FIG. 5 is an enlarged view showing a portion B of FIG. 4.

Referring to FIG. 5, the small diameter portion 412 of the cooling fluid tube 410 includes an inner extension 413 surrounding an outer surface of the gasket 210 and an outer extension 414 formed shorter than the inner extension 413 and extending toward an upper surface of the gasket 210.

The outer extension 414 of this embodiment has a sharp end, and the outer extension 414 and the inner extension 413 are spaced apart from each other to form a gap between them.

As shown in FIG. 5, if the cyrogenic fluid L flows into the first inner space 21, a relative high pressure is formed in the first inner space 21, and a relatively low pressure is formed in the second inner space 11.

Figure 6:
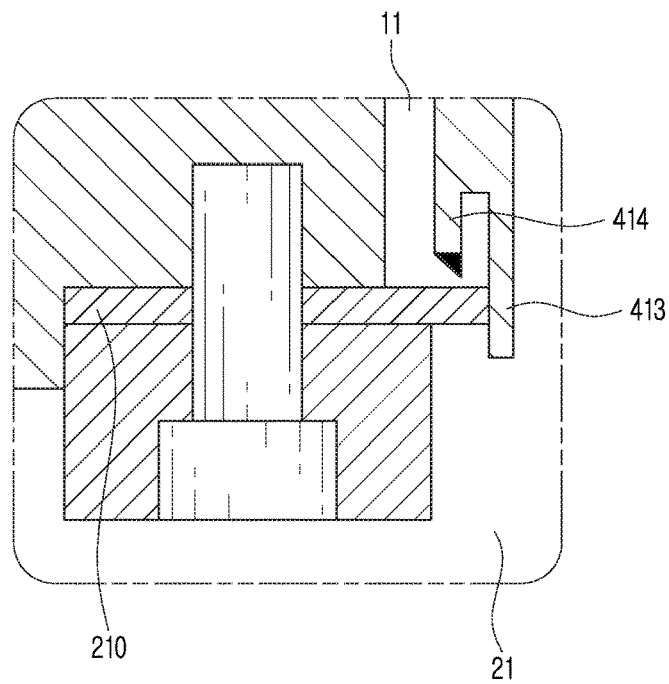
FIGS. 6 and 7 are enlarged view showing a portion C of FIG. 5.
Figure 7:
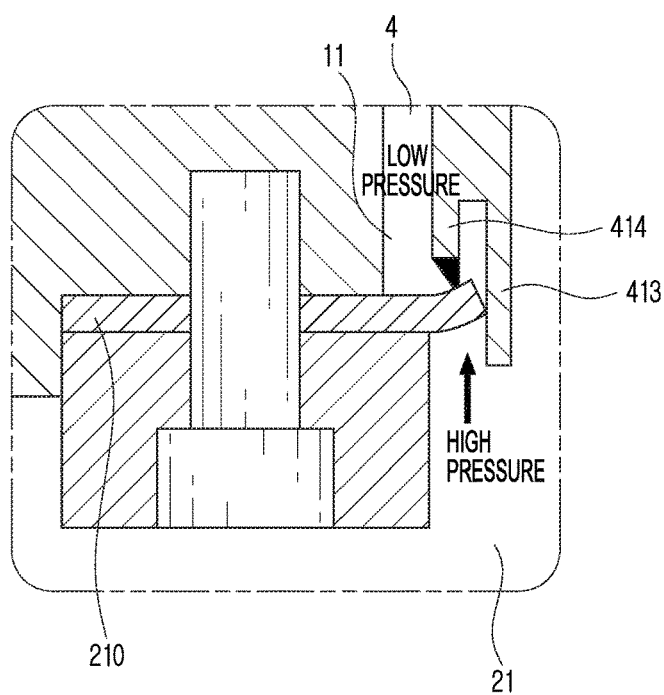

FIGS. 6 and 7 are enlarged view showing a portion C of FIG. 5.

As shown in FIG. 6, before the cyrogenic fluid L flows into the first inner space 21, the gasket 210 is substantially formed to be flat, thereby making a surface contact with the periphery of the inner extension 413. At this time, the upper surface of the gasket 210 may make a contact with the sharp end of the outer extension 414 or be slightly spaced therefrom.

As shown in FIG. 7, if the cyrogenic fluid L flows into the first inner space 21 to generate a difference of pressure between the inside and the outside of the first inner space 21, the end of the gasket 210 is bent toward a low pressure side and makes a contact with the sharp end of the outer extension 414.

Accordingly, the gasket 210 makes a linear contact with the upper surface of the gasket 210 at the sharp end of the outer extension 414, and the gasket 210 and the inner extension 413 are spaced apart from each other or make a linear contact.

Therefore, it is possible to effective seal the gap between the first inner space and the second inner space while preventing the gasket 210 from interfering with the cooling fluid tube 410 and thus deteriorating the degree of rotation freedom of the bearing cap 20.

Meanwhile, referring to FIG. 1 again, the cooling fluid tube 410 is connected to the air cylinder 401 and formed to be movable in a y-axis direction. An axial load cell 402 capable of measuring an axial load is provided between the air cylinder 401 and the cooling fluid tube 410.

Referring to FIG. 5 again, an end 415 of the large diameter portion 411 of the cooling fluid tube 410 makes a contact with an upper end of the inner wheel 71 of the connection bearing 70.

If the cooling fluid tube 410 is pushed downwards in an axial direction by means of the air cylinder 401, the large diameter portion 411 pushes the connection bearing 70 to apply an axial load to the bearing cap 20.

In other words, in this embodiment, the cooling fluid tube 410 also serves as an axial rod for applying an axial load to the bearing cap 20 and thus reproducing a radial load applied to the test bearing 2.

Since the cooling fluid tube 410 is configured to also serve as an axial rod, it is possible to optimize the flow of the cyrogenic fluid L introduced to the bearing cap 20 and also apply a regular axial rod to the test bearing 2.

Meanwhile, the test apparatus 1 of this embodiment includes a means for measuring a whirling motion of the cage 5, which is an important factor for evaluating a behavior of the test bearing 2.

Referring to FIG. 4 again, the cage 5 of the test bearing 2 according to this embodiment includes a reflecting surface 7 protruding vertically (namely, in an axial direction of the driving shaft). In this embodiment, the reflecting surface 7 used for measuring a whirling motion is provide at an upper portion, but reflecting surfaces are symmetrically formed at upper and lower portions of the cage not to give any influence on the symmetry of the test bearing 2.

An optical displacement sensor 721 provided through the side frame 202 of the bearing cap 20 is inserted into the bearing cap 20. The optical displacement sensor 721 irradiates light toward the reflecting surface 7 through the bearing cap 20 and measures a distance to the reflecting surface 7.

The optical displacement sensor 721 is protected by a sheath fixed to the bearing cap 20 by a nut 751, and a tube 731 having an accordion shape is formed at a periphery of the sheath 741 to protect the optical displacement sensor 721 and also prevent the optical displacement sensor 721 from restricting the degree of rotation freedom of the bearing cap 20.

Figure 8:
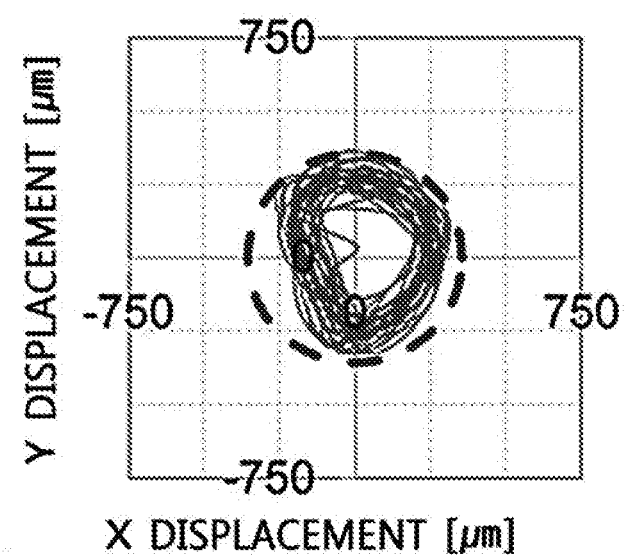
FIG. 8 is a graph showing a measure result of a whirling motion of a cage.

Referring to FIG. 2, two optical displacement sensors 721 are inserted into the bearing cap 20 with an angle of 90 degree, and a whirling motion of the cage 5 as shown in FIG. 8 may be detected from the distance to the cage 5, which is specified by the two optical displacement sensors 721.

An operation state of the test bearing 2 such as a motion of the cage 5 may also be checked by naked eyes through an observation window 115 formed at the chamber 10.

In this embodiment, in order to prevent the cyrogenic fluid L flowing in the chamber 10 from giving an influence on a component for rotating the driving shaft 30, they are isolated from each other.

As shown in FIG. 1, a driving shaft housing 60 is formed to accommodate the main shaft 310 extending out of the chamber 10.

In the driving shaft housing 60, the main shaft 310 is rotatably supported by two support bearings 610.

The support bearing 610 is a ball bearing including an inner wheel, an outer wheel and a ball provided between the inner and outer wheels. The inner wheel of the support bearing 610 is fit into the main shaft 310, and the outer wheel is coupled to the driving shaft housing 60.

A gap is formed between the upper frame of the driving shaft housing 60 and the lower frame 115 of the chamber 10 so that they are substantially spaced apart from each other, and thus the chamber 10 and the driving shaft housing 60 are isolated from each other.

The inside of the driving shaft housing 60 is placed in a normal-temperature environment, and thus the support bearing 610 may be a general bearing which is lubricated with an oil in a normal-temperature environment.

An oil flows into the driving shaft housing 60 through an oil inlet 622 formed at a sidewall at a lower end of the driving shaft housing 60 and lubricates the bearing 610 while passing by the two support bearings 610. The oil passing by the support bearing 610 flows through the gap formed between the chamber 10 and the driving shaft housing 60 and discharges out through an oil outlet 621 formed in the driving shaft housing 60.

By separately disposing the test bearing 2 and the support bearing 610 at isolated areas as described above, it is possible to decrease the number of cyrogenic bearings (test bearings). In addition, it is possible to figure out characteristics of a single test bearing 2. In other words, if the support bearing 610 is not broken, it is possible to exchange only the test bearing 2 mounted to the upper end thereof during an experiment.

The motor 350 for rotating the main shaft 310 may be an induction motor which is controlled to adjust its RPM and acceleration/deceleration by means an inverter. The motor 350 is cooled by means of a coolant flowing from the coolant inlet 906 to the coolant outlet 907.

The driving shaft 30 includes a connection portion for connecting the main shaft 310 to the motor 350.

The connection portion has a connection rotation shaft 330 which extends in series in a y-axial direction along the main shaft 310 and the motor rotation shaft of the motor 350. Flexible couplings 320, 340 made of flexible material are provided to connect the connection rotation shaft 330 and the main shaft 310 and also connect the connection rotation shaft 330 and the motor rotation shaft.

The flexible couplings 320, 340 allow the center of each rotation shaft to be slightly dislocated, thereby minimizing an alignment error among components.

If the motor rotation shaft of the motor 350 rotates, the connection rotation shaft 330 rotates by means of the flexible coupling 340, and the rotation force of the connection rotation shaft 330 is transferred to the main shaft 310 by means of the flexible coupling 320 to rotate the main shaft 310.

The test apparatus 1 of this embodiment includes various sensors for detecting various states of the test bearing 2 and the test apparatus 1, in addition to the torque measurement means, the whirl measurement means and the load applying means described above.

Referring to FIG. 1 again, in order to detect a state of the cyrogenic fluid L flowing into the bearing cap 20, a flowmeter 804, a temperature sensor 909 and a pressure sensor 908 are provided at the fluid inlet tube 411. In addition, a pressure sensor 910 and a temperature sensor 902 for measuring pressure and temperature of a cooling fluid, which flows out, are provided.

By using the measurement values of the temperature sensor, the pressure sensor and the flowmeter, it is possible to check conditions of the fluid inlet and outlet as well as a phase change and a boundary condition (gas, liquid) of an actual cyrogenic fluid.

A temperature sensor 901 for measuring a temperature of the test bearing 2 is formed at the bearing cap 20. Referring to FIG. 2, a small hole may be formed at a portion of the test bearing 2, which is in contact with an outer circumference of the outer wheel 3, and a thermocouple 921 may be inserted therein to measure a temperature of the test bearing 2. The thermocouple 921 is protected by a tube which has a wrinkled portion in at least a part thereof not to restrict the degree of rotation freedom of the bearing cap 20. An amount of heat emitting from the test bearing 2 may be evaluated by using the temperature sensor 901.

Various sensors capable of monitoring states of various components of the test apparatus 1 in addition to the chamber 10 and the bearing cap 20 are provided.

A temperature sensor 903 may be formed at the support bearing 610 to check a temperature of the support bearing 610. A thermocouple of the temperature sensor 903 may make a direct contact with the outer wheel of the support bearing 610 and measure a temperature of the outer wheel of the support bearing 610 to check operation stability of the support bearing.

The connection rotation shaft 330 includes a RPM meter 900 for measuring RPM of a rotation system and a torque meter 905 for measuring a torque. By measuring a torque of the entire upper end by the torque meter 905, it is possible to directly monitor stability of the entire test environment (the support bearing and the test bearing) during the experiment.

The test apparatus 1 includes a vibration sensor 904 for measuring a vibration generated at the test apparatus 1. The vibration sensor 904 is composed using a displacement sensor disposed between the support bearings 610 at the driving shaft housing 60.

Signals of the test bearing 2 and various other components, collected using various sensors and measurers as described above, may be processed using a suitable processing unit and provided to a user through a computer.

In order to evaluate the test bearing 2, a natural signal frequency of the test bearing 2, generated while the test bearing is in operation, may be classified, and the breakage of the test bearing 2 may be evaluated quantitatively.

The bearing test apparatus 1 of this embodiment may accurately measure an exclusive torque of a test bearing while applying a radial or axial load to the test bearing.

The test apparatus 1 of this embodiment may be efficiently used for testing a special bearing, which operates in a special environment such as a cyrogenic environment and a space launch vehicle.

What is claimed is:

1. An apparatus for testing a test bearing, the apparatus comprising:
   a chamber;
   a bearing cap disposed in the chamber, and configured to be coupled to an outer wheel of the test bearing;
   a driving shaft configured to be connected to an inner wheel of the test bearing;
   an extension arm radially extending from the bearing cap, and protruding from the chamber;
   a measurement arm contacting an end of the extension arm, and rotatable about an axis of the measurement arm; and
   a force sensor coupled to the measurement arm.

2. The apparatus according to claim 1, wherein the force sensor includes a load cell.

3. The apparatus according to claim 2, further comprising:
   a pre-load member configured to apply a force to the measurement arm at a location opposite to the load cell.

4. The apparatus according to claim 1, wherein the driving shaft is further configured to rotate about an axis of the driving shaft that is parallel to the axis of the measurement arm.

5. The apparatus according to claim 1, further comprising:
   a radial rod configured to rotatably support the measurement arm, and push the extension arm to apply a radial load to the bearing cap.

6. The apparatus according to claim 1, wherein either one of an end of the extension arm and an end of the measurement arm includes a spherical face.

7. The apparatus according to claim 1, further comprising an optical displacement sensor, wherein the test bearing includes a plurality of balls disposed between the outer wheel and the inner wheel, and a cage configured to fix locations of the plurality of balls, the cage includes a reflecting surface protruding in an axial direction of the driving shaft,
the optical displacement sensor is configured to irradiate light toward the reflecting surface, and measure a distance from the cage to the reflecting surface.

8. The apparatus according to claim 1, further comprising:
   two optical displacement sensors disposed at an angle of 90 degrees with respect to each other, and inserted into the bearing cap.

9. The apparatus according to claim 1, further comprising:
   a cooling fluid tube formed through the bearing cap, configured to introduce a cooling fluid into a first inner space of the bearing cap, passing through a center of an upper end of the bearing cap, and configured to guide the cooling fluid to a center of an upper end of the test bearing.

10. The apparatus according to claim 9, further comprising:
    a flexible gasket surrounding the cooling fluid tube, and fixed to the bearing cap,
    wherein the gasket is configured to be bent due to a difference between a pressure inside of the first inner space and a pressure outside of the first inner space, to seal a gap between the bearing cap and the cooling fluid tube.

11. The apparatus according to claim 10, wherein
    the cooling fluid tube includes an inner extension surrounded by the gasket, and an outer extension that is shorter than the inner extension and that extends toward an upper surface of the gasket, and
    when the gasket is bent, the gasket makes a contact with an end of the outer extension.

12. The apparatus according to claim 11,
    wherein the outer extension has a sharp end, and
    wherein when the gasket is bent, the gasket makes a linear contact with the end of the outer extension.

13. The apparatus according to claim 12, wherein the outer extension and the inner extension are spaced apart from each other to have a gap formed therebetween.

14. The apparatus according to claim 9,
    wherein the cooling fluid tube is formed as an axial rod which presses against an upper end of the bearing cap to apply an axial load to the upper end of the bearing cap.

15. The apparatus according to claim 14, wherein
    the cooling fluid tube includes a large diameter portion pressing the upper end of the bearing cap, and a small diameter portion extending from the large diameter portion to pass through the bearing cap, and
    the large diameter portion is connected to the bearing cap by connection bearing, and the small diameter portion and the bearing cap are spaced apart from each other so that the cooling fluid tube does not disturb rotation of the bearing cap.

16. The apparatus according to claim 9,
    wherein a second inner space accommodating the bearing cap is formed at the chamber, and
    wherein the cooling fluid flows from the first inner space to the second inner space via the test bearing.

17. The apparatus of claim 1, wherein a torque of the test bearing is obtained by measuring a force applied by the extension arm to the measurement arm when a rotation force is applied by the outer wheel to the bearing cap.

18. The apparatus of claim 1, further comprising a cooling fluid tube formed as an axial rod configured to apply a load to an end of the bearing cap.

19. The apparatus of claim 1, further comprising a cooling fluid tube passing through a center of an upper end of the bearing cap.

20. The apparatus of claim 19, wherein the cooling fluid tube is configured to introduce a cooling fluid into an inner space of the bearing cap.

21. The apparatus of claim 20, wherein the cooling fluid tube is further configured to guide the cooling fluid to a center of an upper end of the test bearing.

22. The apparatus of claim 1, where the axis is located between opposite ends of the measurement arm.

23. The apparatus of claim 1, wherein the measurement arm comprises a bearing at the axis to enable the rotation.

24. A apparatus for testing a test bearing, which is a target for a test, the apparatus comprising:
- a chamber;
- a bearing cap disposed in the chamber, and coupled to an outer wheel of the test bearing;
- a driving shaft connected to an inner wheel of the test bearing to rotate the inner wheel;
- an extension arm extending in a radial direction of the bearing cap from the bearing cap to expose one end thereof out of the chamber; and
- a measurement arm configured to make contact with one end of the extension arm, and configured to be rotatable by the extension arm, wherein an exclusive torque of the test bearing is obtained by measuring a force applied to the measurement arm by the extension arm when a rotation force is applied to the bearing cap by the outer wheel, wherein the bearing cap forms an inner space, wherein the apparatus includes a cooling fluid tube formed through the bearing cap to introduce a cooling fluid into the inner space, and wherein the cooling fluid tube extends to pass through a center of an upper end of the bearing cap, thereby guiding the cooling fluid to a center of an upper end of the test bearing.

* * * * *